US009342975B2

(12) United States Patent
Titus et al.

(10) Patent No.: US 9,342,975 B2
(45) Date of Patent: *May 17, 2016

(54) FIRST RESPONDER WIRELESS EMERGENCY ALERTING WITH AUTOMATIC CALLBACK AND LOCATION TRIGGERING

(71) Applicant: TeleCommunication Systems, Inc., Annapolis, MD (US)

(72) Inventors: Mark A. Titus, Annapolis, MD (US); Joseph Pohutsky, Annapolis, MD (US)

(73) Assignee: Telecommunication Systems, Inc., Annapolis, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/504,981

(22) Filed: Oct. 2, 2014

(65) Prior Publication Data
US 2015/0024704 A1 Jan. 22, 2015

Related U.S. Application Data

(63) Continuation of application No. 13/887,870, filed on May 6, 2013, now Pat. No. 8,970,366, which is a continuation of application No. 13/353,734, filed on Jan. 19, 2012, now Pat. No. 8,436,728, which is a
(Continued)

(51) Int. Cl.
*G08B 25/10* (2006.01)
*G08B 25/00* (2006.01)
(Continued)

(52) U.S. Cl.
CPC .............. *G08B 25/006* (2013.01); *G08B 25/10* (2013.01); *H04M 11/04* (2013.01); *H04W 4/02* (2013.01); *H04W 4/22* (2013.01); *H04M 2242/04* (2013.01); *H04M 2242/14* (2013.01)

(58) Field of Classification Search
CPC ........... G08B 25/006; H04M 2242/04; H04M 2242/14
See application file for complete search history.

(56) References Cited

U.S. PATENT DOCUMENTS 3,400,222 A 9/1968 Nightingale
4,742,357 A 5/1988 Rackley
(Continued)

FOREIGN PATENT DOCUMENTS

EP 1030531 8/2000
WO WO97/41654 11/1997
(Continued)

OTHER PUBLICATIONS

"Technology Rides Control Network to Support Short Package Applications"; Advanced Intelligent Network New. Washington, DC: Mar. 19, 1997. vol. 7, Iss. 6; p. 1.
(Continued)

*Primary Examiner* — Van Trieu
(74) *Attorney, Agent, or Firm* — Tarolli, Sundheim, Covell & Tummino LLP

(57) ABSTRACT

Using wireless features, a public service agency is enabled to provide alert information to first responders. An automatic call back from the first responder triggers a voice call launching a location fix on the current location of the first responder. Preferably delivery confirmation that the responder has received the message is received. Once the location fix has been completed, then driving directions with map images are sent to the first responder based on their current location and desired destination for response.

23 Claims, 3 Drawing Sheets

Related U.S. Application Data continuation of application No. 12/453,330, filed on May 7, 2009, now Pat. No. 8,102,252, which is a continuation of application No. 11/346,163, filed on Feb. 3, 2006, now Pat. No. 7,548,158.

(60) Provisional application No. 60/706,050, filed on Aug. 8, 2005.

(51) Int. Cl.
*H04M 11/04* (2006.01)
*H04W 4/22* (2009.01)
*H04W 4/02* (2009.01)

(56) References Cited

U.S. PATENT DOCUMENTS

| | | |
|---|---|---|
| 4,910,767 A | 3/1990 | Brugliera |
| 5,430,759 A | 7/1995 | Yokev |
| 6,026,292 A | 2/2000 | Coppinger |
| 6,073,004 A | 6/2000 | Balachandran |
| 6,073,015 A | 6/2000 | Berggren |
| 6,087,956 A | 7/2000 | Helferich |
| 6,131,028 A | 10/2000 | Whitington |
| 6,240,295 B1 | 5/2001 | Kennedy, III |
| 6,373,930 B1 | 4/2002 | McConnell |
| 6,456,852 B2 | 9/2002 | Bar |
| 6,473,622 B1 | 10/2002 | Meuronen |
| 6,512,930 B2 | 1/2003 | Sandegren |
| 6,526,335 B1 | 2/2003 | Treyz |
| 6,560,456 B1 | 5/2003 | Lohita |
| 6,671,508 B1 | 12/2003 | Mitsouka |
| 6,677,894 B2 | 1/2004 | Sheynblat |
| 6,728,353 B1 | 4/2004 | Espejo |
| 6,731,943 B1 | 5/2004 | McCormick |
| 6,816,580 B2 | 11/2004 | Timmins |
| 6,839,562 B2 | 1/2005 | Smith |
| 6,915,138 B2 | 7/2005 | Kraft |
| 6,990,591 B1 | 1/2006 | Pearson |
| 6,993,325 B1 | 1/2006 | Waesterlid |
| 7,020,480 B2 | 3/2006 | Coskun |
| 7,110,773 B1 | 9/2006 | Wallace |
| 7,116,967 B2 * | 10/2006 | Kauppinen et al. ........ 455/404.1 |
| 7,120,418 B2 | 10/2006 | Herajarvi |
| 7,127,264 B2 | 10/2006 | Hronek |
| 7,145,462 B2 | 12/2006 | Dewing |
| 7,180,415 B2 | 2/2007 | Bankert |
| 7,245,216 B2 | 7/2007 | Burkley |
| 7,328,031 B2 | 2/2008 | Kraft |
| 7,356,328 B1 | 4/2008 | Espejo |
| 7,386,588 B2 | 6/2008 | Mousseau |
| 7,437,348 B1 | 10/2008 | Wyett |
| 7,826,818 B2 | 11/2010 | Gollnick |
| 7,990,279 B2 * | 8/2011 | Bouressa .................. 340/691.1 |
| 8,120,505 B2 * | 2/2012 | Bouressa .................. 340/691.1 |
| 2001/0006889 A1 | 7/2001 | Kraft |
| 2001/0034224 A1 | 10/2001 | McDowell |
| 2001/0049274 A1 | 12/2001 | Degraeve |
| 2002/0181681 A1 | 12/2002 | Mani |
| 2003/0003909 A1 | 1/2003 | Keronen |
| 2003/0058096 A1 | 3/2003 | Shteyn |
| 2003/0096626 A1 | 5/2003 | Sabo et al. |
| 2003/0125042 A1 | 7/2003 | Olrik |
| 2003/0186709 A1 | 10/2003 | Rhodes |
| 2003/0186710 A1 | 10/2003 | Muhonen |
| 2004/0103431 A1 | 5/2004 | Davenport |
| 2004/0137921 A1 | 7/2004 | Valloppillil |
| 2004/0148357 A1 | 7/2004 | Corrigan et al. |
| 2004/0176123 A1 | 9/2004 | Chin |
| 2004/0199614 A1 | 10/2004 | Shenfield |
| 2004/0203900 A1 | 10/2004 | Cedervall |
| 2004/0203922 A1 | 10/2004 | Hines |
| 2005/0003803 A1 | 1/2005 | Buckley |
| 2005/0020287 A1 | 1/2005 | Pohutsky |
| 2005/0101338 A1 | 5/2005 | Kraft |
| 2005/0135569 A1 | 6/2005 | Dickinson |
| 2005/0169248 A1 * | 8/2005 | Truesdale et al. ............. 370/352 |
| 2005/0176445 A1 | 8/2005 | Qu |
| 2005/0261012 A1 | 11/2005 | Weiser |
| 2005/0265536 A1 | 12/2005 | Smith |
| 2005/0266864 A1 | 12/2005 | Chen et al. |
| 2005/0277432 A1 | 12/2005 | Viana |
| 2005/0282518 A1 | 12/2005 | D'Evelyn |
| 2006/0020965 A1 | 1/2006 | Steelberg |
| 2006/0028995 A1 | 2/2006 | Canoy |
| 2006/0030297 A1 | 2/2006 | Coble |
| 2006/0064307 A1 | 3/2006 | Pakkala |
| 2006/0109960 A1 | 5/2006 | D'Evelyn |
| 2006/0116138 A1 | 6/2006 | Simsek |
| 2006/0223549 A1 | 10/2006 | Chang |
| 2006/0276168 A1 | 12/2006 | Fuller |
| 2007/0021098 A1 | 1/2007 | Rhodes |
| 2007/0110076 A1 | 5/2007 | Brouwer |
| 2007/0117574 A1 | 5/2007 | Watanabe |
| 2007/0117577 A1 | 5/2007 | Harris |
| 2007/0136132 A1 | 6/2007 | Weiser |
| 2007/0149208 A1 | 6/2007 | Syrbe |
| 2007/0202897 A1 | 8/2007 | Smith |
| 2008/0263169 A1 | 10/2008 | Brabec et al. |
| 2009/0137244 A1 | 5/2009 | Zhou et al. |
| 2009/0158136 A1 | 6/2009 | Rossano et al. |
| 2009/0158397 A1 | 6/2009 | Herzog et al. |
| 2009/0172804 A1 | 7/2009 | Spies et al. |
| 2009/0221263 A1 | 9/2009 | Titus |
| 2009/0265552 A1 | 10/2009 | Moshir et al. |
| 2009/0265763 A1 | 10/2009 | Davies et al. |
| 2010/0076767 A1 | 3/2010 | Vieri |
| 2010/0120412 A1 | 5/2010 | Tang |
| 2011/0053618 A1 | 3/2011 | Lin et al. |
| 2011/0145564 A1 | 6/2011 | Moshir et al. |
| 2011/0252146 A1 | 10/2011 | Santamaria et al. |
| 2012/0150968 A1 | 6/2012 | Yasrebi et al. |
| 2012/0192287 A1 | 7/2012 | Cai et al. |

FOREIGN PATENT DOCUMENTS

| | | |
|---|---|---|
| WO | WO/98/21913 | 5/1998 |
| WO | WO/03/056853 | 7/2003 |

OTHER PUBLICATIONS

Cellular Mobile Pricing Structures and Trends; Dr. Sam Paltridge of the OECD's Directorate for Science, Technology and Industry; Dist.: May 19, 2000 (Nov. 1999).

European Search Report in European Appl. No. 04778713.0-2412 dated Jul. 13, 2011.

47 code of federal regulations (Oct. 1, 2005 Edition).

* cited by examiner

FIRST RESPONDER WIRELESS EMERGENCY ALERTING WITH AUTOMATIC CALLBACK AND LOCATION TRIGGERING

This application is a continuation of U.S. application Ser. No. 13/887,870, entitled "First Responder Wireless Emergency Alerting with Automatic Callback and Location Triggering," to Titus and Pohutsky, filed May 6, 2013, now U.S. Pat. No. 8,970,366; which in turn is a continuation of U.S. application Ser. No. 13/353,734, entitled "First Responder Wireless Emergency Alerting with Automatic Callback and Location Triggering," to Titus and Pohutsky, filed Jan. 19, 2012, now U.S. Pat. No. 8,436,728; which in turn is a continuation of U.S. application Ser. No. 12/453,330, entitled "First Responder Wireless Emergency Alerting with Automatic Callback and Location Triggering," to Titus and Pohutsky, filed May 7, 2009, now U.S. Pat. No. 8,102,252; which in turn is a continuation of U.S. application Ser. No. 11/346,163, entitled "First Responder Wireless Emergency Alerting with Automatic Callback and Location Triggering," to Titus and Pohutsky, filed Feb. 3, 2006, now U.S. Pat. No. 7,548,158; which in turn claims priority from U.S. Provisional Application No. 60/706,050, entitled "First Responder Wireless Emergency Alerting with Automatic Callback and Location Triggering," to Titus and Pohutsky, filed Aug. 8, 2005, the entirety of all of which are expressly incorporated herein by reference.

BACKGROUND OF THE INVENTION

1. Field of the Invention

This invention relates generally to communications in an emergency. More particularly, it relates to the use of wireless telecommunication such as short message systems (SMS), prepaid wireless systems, wireless location systems, wireless voice, multimedia systems (MMS) and/or wireless mapping systems for alerting first responders and/or others.

2. Background of the Related Art

Emergency alert systems exist that alert the public of a public emergency. However, existing technologies have not been successfully integrated to provide a complete as possible solution for emergency alert notification and management of first responders.

In the United States, the Emergency Alert System (EAS) is the primary means for providing the public with critical alert information about an emergency or disaster. This Federal Communications Commission (FCC)—mandated system totally replaced the old Emergency Broadcast System as of Jan. 1, 1998. Under EAS rules, radio, TV, and cable TV stations must participate at the National level or specifically request a waiver from the FCC. Further, they are encouraged to voluntarily participate in state and local EAS plans. The National Weather Service (NWS) is also included in the process for using EAS to disseminate critical emergency weather information to the public and government officials.

The EAS takes advantage of digital technology that will ultimately allow home devices such as AM and FM radios, TVs, or unique receivers to be turned on and an alarm sounded so the listener can hear the message. It will also allow devices serving the hearing and sight impaired to receive the message. The heart of the system is a special encode/decode device sometimes referred to as a "smart box" that all broadcasters had to have in-place as of January 1997. These "smart boxes" through special protocol, talk to each other via multiple radio frequency (RF) paths, which form a web type architecture. As outlined in the State EAS Plan, all "signal originators" will initiate an alert message from one of the "smart box" devices. Through "electronic encoding" of the message, which this device accomplishes, the message is generated and sent. Through "electronic decoding" of the message, the message is received and/or rebroadcast for the areas the alert message is targeted.

The original Emergency Broadcast System (EBS), developed in 1963 under the Kennedy administration, was replaced in 1994 by the Emergency Alert System (EAS), developed by the FCC. The EAS expanded the EBS to more outlets and allowed more detailed information to be distributed, but even the EAS relies extensively on television and radio to distribute warnings. FEMA, which manages the EAS, is now teaming with other federal agencies as well as state technology leadership and the private sector to create an All Alert system. The All Alert system will build on the Amber Alert infrastructure to more efficiently alert the public via a wide variety of communication devices, when emergencies occur.

All Alert is anticipated to utilize the digital capabilities of the nation's public television stations and the voluntary participation of cellular phone service providers, public and commercial radio, television broadcasters, satellite radio, cable and Internet providers, and equipment manufacturers.

One goal of the All Alert system is to adapt the Amber Alert platform to a common messaging infrastructure that will be owned at the federal and state levels such that when an alert goes out to the public, it will be very easy for anyone to pick up the message via a variety of communication tools. All Alert is expected to greatly expand the EAS, which today is restricted in how much information it can provide and its ability to supply follow-up instructions, such as where people should seek shelter.

While Amber Alert is one specific alert coming from one specific first responder group—law enforcement—All Alert is anticipated to include multiple types of alerts from multiple first responder groups that are then passed to the public. The All Alert system is expected to make first responders' jobs easier because they can get information out to the community fast. However, neither the All Alert system nor any other existing technology has been able to provide a complete solution for emergency alert notification and management not directed to the public, but rather to first responders.

The prior emergency alert systems such as EAS, EBS and All Alert are all broadcast technologies wherein any or all persons in the public hear the same generalized information. There is a need for an emergency alert notification system that is focused on a particular receiver. There is also a need for methods to alert first responders to emergencies, as well a system and method to provide the first responders with information relating to the emergency for which they are being alerted.

SUMMARY OF THE INVENTION

In accordance with the principles of the present invention, apparatus is provided to provide alert information to a first responder in an emergency situation, comprising an alerts engine to trigger an alert message to at least one first responder. A remote agent communicates the alert message to the first responder via a data message gateway. A first responder database stores information for use by the alerts engine relating to provisions of the first responder.

In accordance with another aspect of the invention, a method for providing alert information to a first responder in an emergency situation comprises directing an emergency message to a first responder. The emergency message is relevant to a specific current location of the first responder. An automatic call back to a sender of the emergency message is initiated. A voice call is triggered from the first responder. A location fix on a current location of the first responder is launched.

DETAILED DESCRIPTION OF ILLUSTRATIVE EMBODIMENTS

The present invention enables a public service agency to notify and manage a team of first responders in the event of an emergency. The present invention is independent of mobile operator networks regardless of wireless network standard GSM, CDMA, TDMA, etc.

Disparate technologies in the field of Internet, wireless voice and data communication, and emergency alerting are integrated to uniquely leverage a wireless intelligent network and application triggers that enable a public service agency to provide alert information to first responders.

Figure 1:
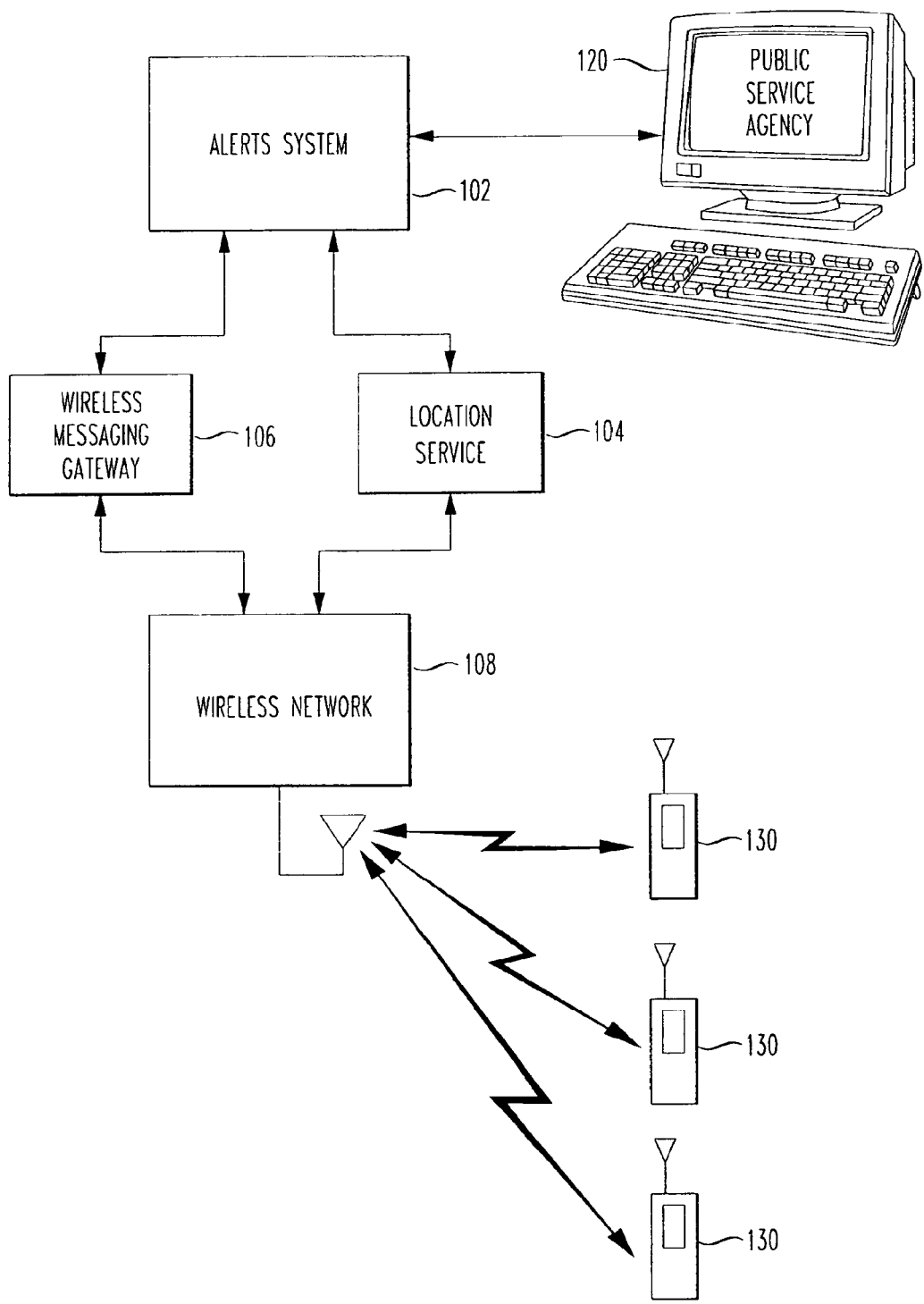
FIG. 1 is a general depiction of a first responder wireless emergency alerting system according to the present invention.

FIG. 1 is a general depiction of a first responder wireless emergency alerting system according to the present invention.

In particular, as shown in FIG. 1, the first responder wireless emergency alerting system includes an alerts system 102, in communication with a wireless messaging gateway 106, in turn in communication with a wireless network 108 servicing a plurality of wireless devices (e.g., mobile phones 130). The wireless network 108 has access to a location service 104, which provides information concerning the location of wireless devices 130 to the alerts system 102 for use by, e.g., a public service access point (PSAP) 120.

Figure 2:
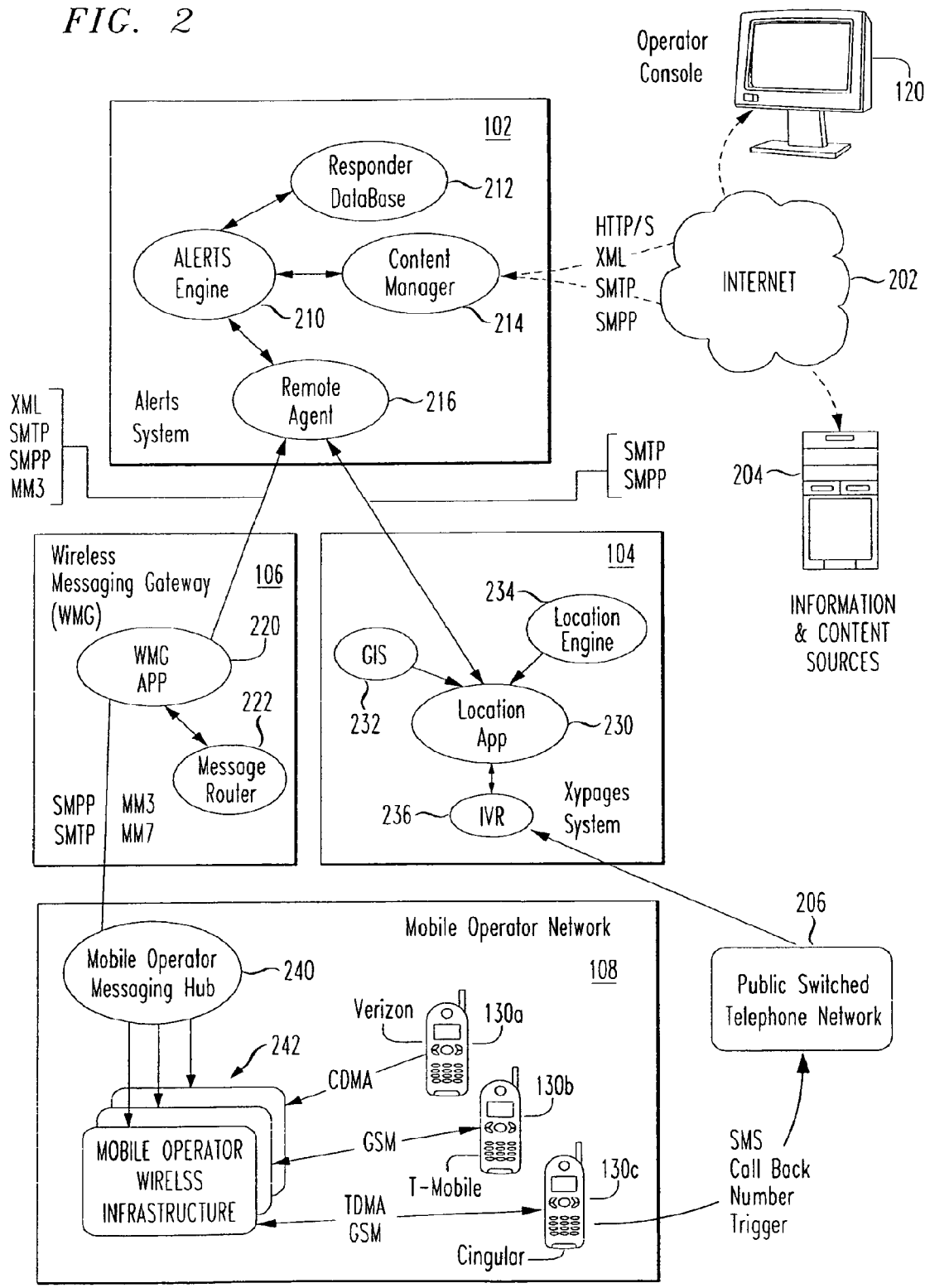
FIG. 2 shows an exemplary detailed network diagram of the first responder wireless emergency alerting system of FIG. 1.

FIG. 2 shows an exemplary detailed network diagram of the first responder wireless emergency alerting system of FIG. 1.

In particular, as shown in FIG. 2, an exemplary alerts system 102 includes an alerts engine 210, a responder database 212, a content manager 214, and a remote agent 216.

The location service 104 includes a location application 230, e.g., an XYPages™ application commercially available from TeleCommunication Systems, Inc. of Annapolis, Md. The location service 104 further includes an interactive voice response (IVR) module 236, a location engine 234, and a Geographic Information System (GIS) 232.

The wireless messaging gateway 106 can be depicted as including a wireless messaging gateway application 220 as well as a message router 222.

The wireless network 108 can vary greatly. In the exemplary embodiments, the wireless network 108 is depicted as including a mobile operator messaging hub 240, and one or more mobile operator wireless infrastructures 242, each corresponding to its own mobile devices 130a, 130b, 130c. To show the breadth of applicability of the present invention, a wireless infrastructure is shown supporting CDMA type mobile devices 130a, GSM type mobile devices 130b, and TDMA/GSM type mobile devices 130c, herein referred to collectively in any combination, including as only a single type device, by reference 130.

The mobile devices 130 of the mobile operator network 108 may communicate back with the location service 104 via the public switched telephone network (PSTN) 206. Moreover, the PSAP or other emergency agency preferably communicates with the alerts system 102 via the Internet 202. Other information and/or content sources 204 are accessible through the Internet 202.

In accordance with the principles of the present invention, the public service (e.g., emergency) agency 120 preferably receives positive acknowledgement that each responder, utilizing respective mobile devices 130, has received their emergency alert information. In the disclosed embodiments, a positive acknowledgement is sent using an embedded call-back number in the alert that initiates an automatic call back (e.g., voice call). Preferably, the automatic call back (e.g., voice call) is directed to the interactive voice response (IVR) system 136, located, e.g., with the location service 104.

A serving mobile switching center processes execution of an IVR call back event, and triggers a location request. The location request launches a location fix on the current location of the relevant first responder being alerted.

Once the location fix has been completed for a given first responder being alerted, then location-based information may be sent to that first responder 130. In a preferred embodiment, the location-based information is determined and sent to the relevant first responder 130 as a current location fix for that first responder 130. Though not preferred, the location-based information may alternatively be transmitted to the first responders 130 after the location of all first responders 130 being alerted is obtained.

Exemplary location-based information sent to the first responders 130 may include, but is certainly not limited to, driving directions and/or a map image relevant to the emergency. For instance, a map between the current location of that particular first responder and the location of the incident to which they are responding may be provided, together with driving directions particular to that first responder to guide them the fastest and/or best route to the emergency destination.

The fastest and/or best route provided to the first responder 130 may include and/or be determined based upon current traffic conditions. For instance, traffic may be congested in a region along a most direct route for the first responder 130 to take to the destination. In such a case, driving directions may instruct and/or direct the first responder 130 around such congestion.

The fastest and/or best route may also, or alternatively, direct the first responder 130 along a route controlled by street lights for fast, safe passage of the first responder's vehicle. In any event, generally speaking, driving directions and/or map image or other relevant location-based information may be sent to the first responder based on their current location and instigating destination in need of emergency response.

Figure 3:
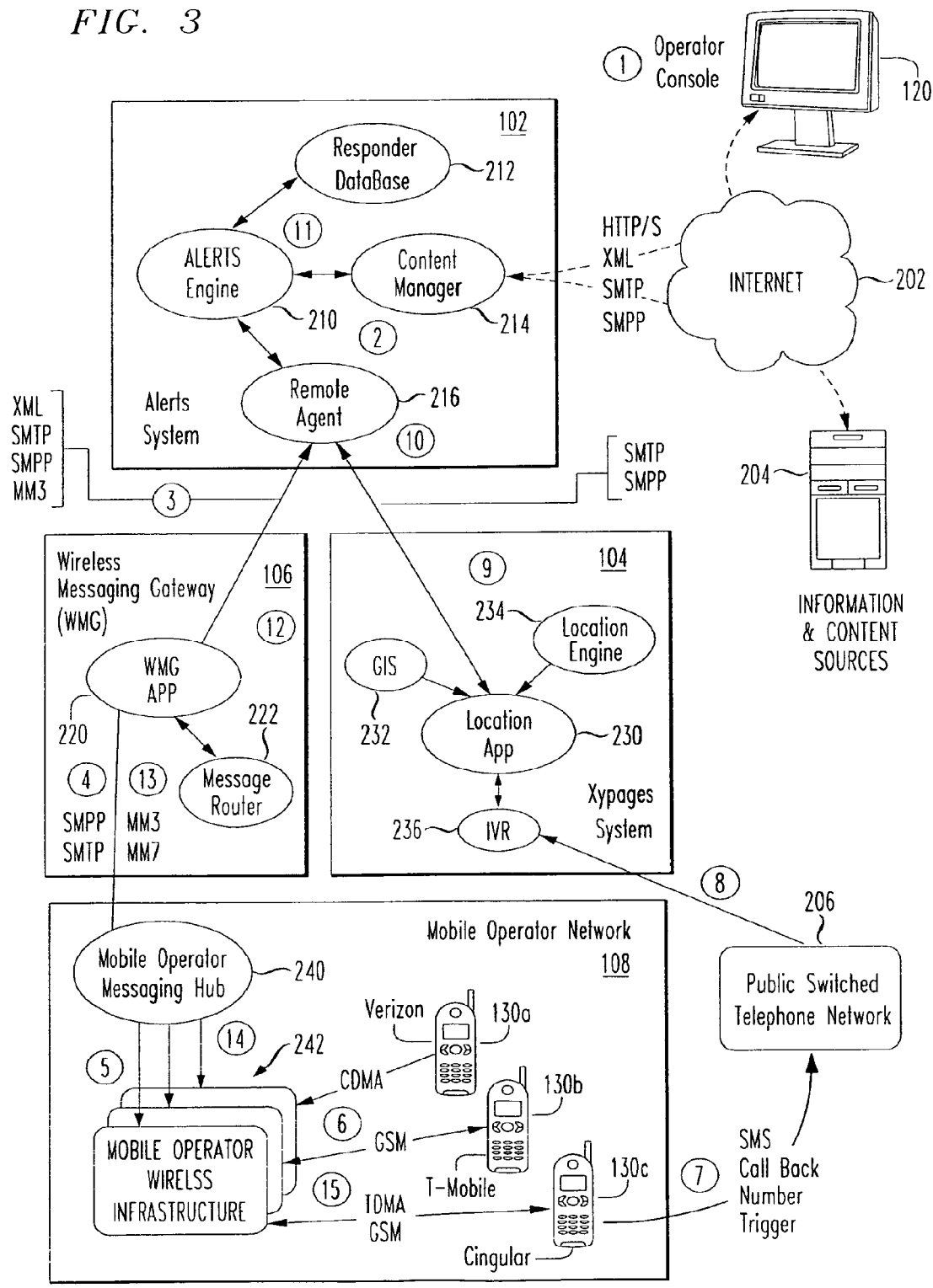
FIG. 3 shows an exemplary message flow passed among the various elements of FIG. 2, in accordance with one embodiment of the present invention.

FIG. 3 shows an exemplary message flow passed among the various elements of FIG. 2, in accordance with one embodiment of the present invention.

In particular, a message flow is depicted by circled numeric references 1 through 15, as shown in FIG. 3 and as described herein below.

For example, in step 1 of FIG. 3, the system operator launches a web browser to access the alerts system 102 via a secure HTTP session over the Internet 202. The system operator first provisions a list of mobile first responder users 130 and their respective member groups in the responder database 212. Provisioning information is used to describe the profile of each individual responder 130. Profile information preferably includes, but is not limited to, the following:

mobile directory number e.g., cell phone number;

mobile device type; and

Information content type used to trigger an emergency alert e.g., Homeland Security, National Weather Service, etc.

Information content can be "published" to mobile responders 130 in one of two methods:

manually through operator data entry; or automatically through information content received asynchronously from external sources over a secure Internet connection (note that this example call flow uses HTTP/S). The information very preferably can be transferred via several different communication protocols, e.g., HTTP/S, FTP, SMPP, SMTP, etc.

In step 2, an external content source 204 sends an information alert (e.g., change in terror alert level) to the content manager 214 component of the alerts system 102. The content manager 214 logs the event into the responder database 212, processes the received information extracting the payload data, i.e., the actual message to be sent to the mobile responder 130, then passes the message onto the alerts engine 210 for further processing and delivery to the mobile device 130.

The alerts engine 210 application logic associates the content type (e.g., terrorist alert) with a unique 10 digit phone number that subsequently rings on an inbound port on the location service's Interactive Voice Response (IVR) subsystem 236 (e.g., an XYpages Interactive Voice Response (IVR) system commercially available from TeleCommunications Systems, Inc.)

The 10-digit IVR phone number corresponding to content type is then encoded as a callback number primitive in the destination message that is ultimately sent to the mobile responder 130. Once the alerts message composition is completed, the alerts engine 210 places the message into the send queue of the remote agent component 216.

In step 3, the remote agent 216 forwards the message to the Wireless Messaging Gateway (WMG) 220 for final formatting and routing to the mobile operator network 108. The remote agent 216 can forward this message using any suitable industry standard protocol, e.g., SMTP, SMPP, XML, MM3 or RMI. Regardless of the communications protocol used, the emergency alerts notification message is of type plain text and can be further encoded to receive delivery receipt confirmation.

In step 4, the WMG 220 forwards the message to the mobile operator messaging hub 240 or equivalent network element via any suitable industry standard protocol, e.g., SMTP, SMPP, MM3, MM7, XML, or RMI. The actual communications protocol used is dependent upon the type of message (e.g., plain text or multimedia) and carrier specific interface provisioning parameters.

In step 5, the mobile operator messaging hub 240 delivers the inbound alerts message to the messaging network element as defined by the messaging routing rules or algorithms set up by each operator. Typically plain text messages with character length of <160 characters will be sent to a short message service center (SMSC) store and forward.

Alternatively, or additionally, as a result of executing the callback, the emergency agency may preferably receive a positive acknowledgement that a first responder 130 has responded. In this way, the alerts operator may be provided with positive confirmation that the recipient(s) successfully received the information alert, as well as their current location.

In step 6, the SMSC follows the appropriate industry standard specification (e.g., GSM, TDMA, or CDMA) for delivery of the emergency alerts message to the destination mobile device 130. After the message is delivered to the mobile device 130, the end user may open the message to read the information content. Since a callback number has been encoded in this alert message, the mobile device 130 can automatically initiate a phone call as a reply to this message. In a preferred embodiment, a 'one button reply' may be implemented for the user (e.g., first responder) of the mobile device 130 to activate at their mobile device 130 to initiate the reply phone call.

In step 7, the mobile user invokes a call back number function from their mobile device 130 to originate a phone call that terminates on a suitable application port, e.g., an "XYpages IVR"™ system 236 inbound port corresponding to the alert type (e.g., terrorist level). A call trigger is set up in the Mobile Switching Centers (MSCs) in the operator network 108 to forward the Origination Request message (e.g., ORREQ in IS-41) to an SS7 point code (i.e., address) corresponding to, e.g., an XYpages™ voice service.

A location query is then initiated. For instance, the network origination request message may be used by the location application 230 to launch a location query to the network's generic position determination entity (PDE) to determine the actual location (i.e., X, Y coordinate) of the mobile first responder subscriber 130. This location query message conforms to industry standard techniques used in either GSM or CDMA wireless networks.

In step 8, once the location query returns the location of the first responder, the location application 230 instructs the MSC 108 to forward to call onto the called party (e.g., terrorist level IVR port). At this point in the disclosed embodiment, the first responder user hears a pre-recorded announcement corresponding to the appropriate message, e.g., "The terrorist alert level has been raised; please await further information and instructions that will be sent to your device momentarily."

In step 9, the location application 230 then uses the location of the first responder as the starting address input parameter to create, e.g., driving directions, map, etc. as calculated by the location engine component 234. The location engine component 234 looks up destination reporting addresses as provisioned by the alerts operator based on the type of scenario.

For example, in the case of a terrorist alert level, the destination address might correspond to an airport, government building, port authority, etc. Preferably, public service agency personnel or other operators will have provisioned this information in advance. The location engine 234 may generate step by step driving instructions and/or a map image containing, e.g., destination points of interest, and preferably the current location of the first responder as a starting point.

The location application 230 encodes the calling party identification (i.e., mobile directory number of the mobile responder), date and time stamp of call received, mobile responder current location, driving directions and map image into a data structure that is forwarded to the alerts remote agent 216.

In step 10, the alerts remote agent 216 decodes the information received by the location application 230 and passes the message on to the alerts engine 210 for processing.

In step 11, the alerts engine 210 processes the information and logs the call record into the responder database 212 as tracking data. This also provides the alerts operator with positive confirmation that the recipient(s) successfully received the information alert, as well as their current location.

In step 12, in this scenario, the alerts engine 210 composes the driving directions and/or map image into a suitable multimedia message, e.g., in the MM3 protocol as defined by the 3GPP standards body for Multimedia Messaging System (MMS). The alerts engine 210 then places this message into the send queue of the remote agent 216, which then forwards it onto the WMG 106.

It is important to note that the service is not limited to sending of map images only. The alerts engine 210 preferably supports any Multipurpose Internet Mail Extension (MIME) type attachment that is capable of being transmitted by the alerts engine 210, e.g., a terrorist photo, an audio sound byte, a video recording, etc.

In step 13, the WMG 106 examines the mobile directory number specified in the inbound message and uses the message router 222 to translate the destination address to the appropriate carrier domain name. In this case the message type is a multimedia message containing driving directions and map image.

In step 14, the mobile operator messaging hub 240 delivers the MMS message to the messaging network element 108 as defined by the messaging routing rules or algorithms setup by each operator. In this case the message will be routed to the appropriate MMSC network element. Should the mobile device 130 not support MMS, then images (e.g., the map image) may be stripped and only plain text sent (e.g., driving instructions).

In step 15, the MMSC follows the appropriate industry standard specification (e.g., GSM, TDMA, and CDMA) for delivery of the multimedia message to the destination mobile device 130. After the message is delivered to the first responder's mobile device 130, the end user is able to open the message to read its information content, thereby ending the service call flow.

The present invention has particular applicability for use by local, state and federal government agencies.

While the invention has been described with reference to the exemplary embodiments thereof, those skilled in the art will be able to make various modifications to the described embodiments of the invention without departing from the true spirit and scope of the invention.

What is claimed is:

1. A method for providing location-based information to a first responder device, comprising:
   triggering an automatic callback, from a physical emergency services server, to a given callback phone number from a first responder wireless device, with a callback communication data message transmitted to said first responder wireless device;
   obtaining, at said physical emergency services server, a current location fix on said first responder wireless device in response to said triggered automatic callback from said first responder wireless device; and
   communicating location-based information to said first responder wireless device based on said location fix obtained by said physical emergency services server.

2. The method for providing location-based information to a first responder device according to claim 1, wherein:
   said location-based information is communicated from said physical emergency services server, and includes a current location of said first responder wireless device.

3. The method for providing location-based information to a first responder device according to claim 1, wherein:
   said location fix on said first responder wireless device is obtained from a remote physical location based services server.

4. The method for providing location-based information to a first responder device according to claim 1, further comprising:
   receiving, at said physical emergency services server, an acknowledgement message that said first responder wireless device has received said callback communication data message.

5. The method for providing location-based information to a first responder device according to claim 4, further comprising:
   initiating said acknowledgement message with a voice callback call from said first responder wireless device.

6. The method for providing location-based information to a first responder device according to claim 5, further comprising:
   routing said voice callback call at least in part using a Public Switched Telephone Network (PSTN).

7. The method for providing location-based information to a first responder device according to claim 4, further comprising:
   routing said acknowledgement message to a location based services server.

8. A system to provide location-based information to a first responder device, comprising:
   a physical emergency services server to trigger an automatic callback to a given callback phone number from a first responder wireless device, with a callback communication data message transmitted to said first responder wireless device;
   a location engine to obtain a current location fix on said first responder wireless device in response to said triggered automatic callback from said first responder wireless device; and
   a transmitter to transmit location-based information to said first responder wireless device based on said location fix obtained by said physical emergency services server.

9. The system to provide location-based information to a first responder device according to claim 8, wherein said first responder wireless device comprises:
   a wireless telephone.

10. The system to provide location-based information to a first responder device according to claim 8, further comprising:
    a responder device database to store information for use by said physical emergency services server relating to provisions of said first responder wireless device.

11. The system to provide location-based information to a first responder device according to claim 8, wherein:
    said callback communication data message includes said a current location of said first responder wireless device.

12. The system to provide location-based information to a first responder device according to claim 8, wherein:
    said current location of said first responder wireless device is retrieved from a location based services server.

13. The system to provide location-based information to a first responder device according to claim 8, wherein said callback communication data message comprises:
    a map.

14. The system to provide location-based information to a first responder device according to claim 8, wherein said callback communication data message comprises:
    navigation instructions.

15. The system to provide location-based information to a first responder device according to claim 8, further comprising:

an acknowledgement module to receive an acknowledgement message that said first responder wireless device has received said callback communication data message.

16. Apparatus for providing location-based information to a first responder device, comprising:
- means for triggering an automatic callback, from a physical emergency services server, to a given callback phone number from a first responder wireless device, with a callback communication data message transmitted to said first responder wireless device;
- means for obtaining, at said physical emergency services server, a current location fix on said first responder wireless device in response to said triggered automatic callback from said first responder wireless device; and
- means for communicating location-based information to said first responder wireless device based on said location fix obtained by said physical emergency services server.

17. The apparatus for providing location-based information to a first responder device according to claim 16, wherein:
said location-based information is communicated from said physical emergency services server, and includes a current location of said first responder wireless device.

18. The apparatus for providing location-based information to a first responder device according to claim 16, wherein:
said location fix on said first responder wireless device is obtained from a remote physical location based services server.

19. The apparatus for providing location-based information to a first responder device according to claim 16, further comprising:
means for receiving, at said physical emergency services server, an acknowledgement message that said first responder wireless device has received said callback communication data message.

20. The apparatus for providing location-based information to a first responder device according to claim 19, further comprising:
means for initiating said acknowledgement message with a voice callback call from said first responder wireless device.

21. The apparatus for providing location-based information to a first responder device according to claim 20, further comprising:
means for routing said voice callback call at least in part using a Public Switched Telephone Network (PSTN).

22. The apparatus for providing location-based information to a first responder device according to claim 19, further comprising:
means for routing said acknowledgement message to a location based services server.

23. The apparatus to provide alert information to a responder device according to claim 16, further comprising:
a content manager to provide content inserted into said callback communication data message.

\* \* \* \* \*